United States Patent [19]

Fujinami et al.

[11] 3,876,796

[45] Apr. 8, 1975

[54] ANTI-FUNGAL COMPOSITION AND METHOD

[75] Inventors: Akira Fujinami, Ashiya; Toshiaki Ozaki, Osaka; Katsuji Nodera, Nishinomiya; Sigeo Yamamoto; Keiichiro Akiba, both of Osaka; Katsutoshi Tanaka, Takarazuka; Tadashi Ooishi, Osaka, all of Japan

[73] Assignee: Sumitomo Chemical Co., Ltd., Osaka, Japan

[22] Filed: Nov. 13, 1972

[21] Appl. No.: 305,998

Related U.S. Application Data

[63] Continuation of Ser. No. 861,178, Sept. 25, 1969, abandoned.

[30] Foreign Application Priority Data

Nov. 27, 1968 Japan.................................. 43-87108

[52] U.S. Cl................ 424/300; 260/471 C; 424/23; 424/46; 424/357
[51] Int. Cl............................................. A01n 9/20
[58] Field of Search...................................... 424/300

[56] References Cited
UNITED STATES PATENTS
3,142,694  7/1964  Metivier........................... 260/455 A
FOREIGN PATENTS OR APPLICATIONS
43-16074  7/1968  Japan.................................. 424/300

Primary Examiner—Albert T. Meyers
Assistant Examiner—Dale R. Ore
Attorney, Agent, or Firm—Bierman & Bierman

[57] ABSTRACT

α-(N-Phenylcarbamoyloxy)alkanoate derivatives of the formula:

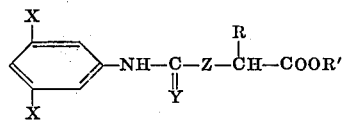

wherein X is halogen, Y and Z are each oxygen or sulfur and R and R' are each hydrogen or lower alkyl are useful as antimicrobial agents. The derivatives are prepared by reacting a 3,5-dihalogenated phenyl isocyanate derivative of the formula:

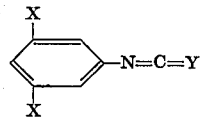

wherein X and Y are each as defined above with a glycolic acid derivative of the formula:

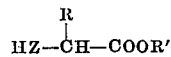

wherein Z, R and R' are each as defined above.

4 Claims, No Drawings

AN ANTI-FUNGAL COMPOSITION AND METHOD

This is a continuation of copending application Ser. No. 861,178, filed Sept. 25, 1969 and now abandoned. The priority of Japanese application 87108/1968 filed Nov. 27, 1968 is claimed.

The present invention relates to novel α-(N-phenylcarbamoyloxy)alkanoate derivatives, and their production and use.

The α-(N-phenylcarbamoyloxy)alkanoate derivatives are representable by the formula:

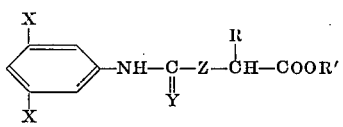

wherein X is halogen (e.g. chlorine, bromine, iodine), Y and Z are each oxygen or sulfur and R and R' are each hydrogen or lower alkyl (e.g. methyl, ethyl, propyl, isopropyl, butyl), the term "lower" meaning the one having 1 to 5 carbon atoms.

Thus, the term "α-(N-phenylcarbamoyloxy)alkanoate derivatives" herein used has a broad meaning and is intended to include the following four kinds of compounds:

α-[N-(3,5-dihalogenated phenyl)carbamoyloxy]alkanoic acid and its derivatives [I: Y = oxygen, Z = oxygen]; α-[N-(3,5-dihalogenated phenyl)thiocarbamoyloxy]alkanoic acid and its derivatives [I: Y = sulfur, Z = oxygen]; α-[N-3,5-dihalogenated phenyl)carbamoylthio]alkanoic acid and its derivatives [I: Y = oxygen, Z = sulfur]; and α-[N-(3,5-dihalogenated phenyl)thiocarbamoylthio]alkanoic acid and its derivatives [I: Y = sulfur, Z = sulfur].

Specific examples of compounds in the category of α-(N-phenylcarbamoyloxy)alkanoate derivatives [I] are as follows: α-[N-(3,5-dihalophenyl)carbamoyloxy]-lower alkanoic acid (e.g. N-(3,5-dichlorophenyl)carbamoyloxyacetic acid, N-(3,5-dibromophenyl)carbamoyloxyacetic acid, α-[N-(3,5-dichlorophenyl)carbamoyloxy]-propionic acid, α-[N-(3,5-dichlorophenyl)carbamoyloxy]-butyric acid), lower alkyl α-[N-(3,5-dihalophenyl)-carbamoyloxy]-lower alkanoate (e.g. methyl N-(3,5-dichlorophenyl)-carbamoyloxyacetate, ethyl N-(3,5-dichlorphenyl)carbamoyloxyacetate, ethyl α-[N-(3,5-dichlorophenyl)carbamoyloxy]propionate), α-[N-(3,5-dihalophenyl)thiocarbamoyloxy]-lower alkanoic acid (e.g. N-(3,5-dichlorophenyl)thiocarbamoyloxyacetic acid, N-(3,5-dibromophenyl)thiocarbamoyloxyacetic acid, α-[N-(3,5-dichlorophenyl)thiocarbamoyloxy]propionic acid), lower alkyl α-[N-(3,5-dihalophenyl)thiocarbamoyloxy]-lower alkanoate (e.g. methyl N-(3,5-dichlorophenyl)thiocarbamoyloxyacetate, ethyl N-(3,5-dichlorophenyl)thiocarbamoyloxyacetate, ethyl α-[N-(3,5-dichlorophenyl)thiocarbamoyloxy]propionate), α-[N-(3,5-dihalophenyl)carbamoylthio]-lower alkanoic acid (e.g. N-(3,5-dichlorophenyl)carbamoylthioacetic acid, N-(3,5-dibromophenyl)carbamoylthioacetic acid, α-[N-(3,5-dichlorophenyl)carbamoylthio]-propionic acid), lower alkyl α-[N-(3,5-dihalophenyl)carbamoylthio]-lower alkanoate (e.g. methyl N-(3,5-dichlorophenyl)carbamoylthioacetate, ethyl N-(3,5-dichlorophenyl)carbamoylthioacetate, ethyl α-[N-(3,5-dichlorophenyl)carbamoylthio]propionate), α-[N-(3,5-dihalophenyl)thiocarbamoylthio]-lower alkanoic acid (e.g. N-(3,5-dichlorophenyl)thiocarbamoylthioacetic acid, N-(3,5-dibromophenyl)thiocarbamoylthioacetic acid, α-[N-(3,5-dichlorophenyl)thiocarbamoylthio]propionic acid), lower alkyl α-[N-(3,5-dihalophenyl)thiocarbamoylthio]-lower alkanoate (e.g. methyl N-(3,5-dichlorophenyl)thiocarbamoylthioacetate, ethyl N-(3,5-dichlorophenyl)thiocarbamoylthioacetate, ethyl α-[N-(3,5-dichlorophenyl)thiocarbamoylthio]-propionate), etc.

It has now been found that said α-(N-phenylcarbamoyloxy)alkanoate derivatives [I] exhibit a strong anti-microbial activity against a wide variety of microorganisms including phytopathogenic fungi and parasites of industrial products. This finding is an unexpected and surprising property in light of the fact that analogous compounds such as the corresponding 3,5-unhalogenated derivatives show no appreciable activity.

A basic object of the present invention is to embody the novel α-(N-phenylcarbamoyloxy)alkanoate derivatives [I]. Another object of this invention is to embody the α-(N-phenylcarbamoyloxy)alkanoate derivatives [I] having a marked anti-microbial activity. A further object of the invention is to embody a process for preparing the α-(N-phenylcarbamoyloxy)alkanoate derivatives [I]. These and other objects will be apparent from the subsequent descriptions to those conversant with the art to which the present invention pertains.

According to the present invention, the α-(N-phenylcarbamoyloxy)alkanoate derivatives [I] are prepared by reacting a 3,5-dihalogenated phenyl isocyanate derivative of the formula:

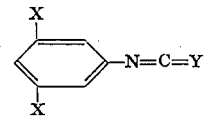

wherein X and Y are each as defined above with a glycolic acid derivative of the formula:

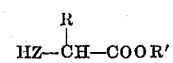

wherein Z, R and R' are each as defined above.

Examples of the 3,5-dihalogenated phenyl isocyanate derivative [II] are 3,5-dichlorophenyl isocyanate, 3,5-dibromophenyl isocyanate, 3,5-dichlorophenyl isothiocyanate, 3,5-dibromophenyl isothiocyanate, etc. Examples of the glycolic acid derivative [III] are glycolic acid, thioglycolic acid, methyl glycolate, ethyl glycolate, methyl thioglycolate, ethyl thioglycolate, methyl lactate, ethyl lactate, methyl thiolactate, ethyl thiolactate, etc.

The reaction between the 3,5-dihalogenated phenyl isocyanate derivative [II] and the glycolic acid derivative [III] may be carried out in an inert solvent (e.g. benzene, toluene, xylene, ether, chloroform) in the presence of a catalytic amount of an organic base (e.g. pyridine, triethylamine, N-methylmorpholine) at a temperature ranging from room temperature to reflux temperature. The reaction is usually completed within several hours. By evaporation of the solvent from the reaction mixture, the objective α-(N-phenylcarbamoyloxy)alkanoate derivative [I] is obtained.

As stated above, the α-(N-phenylcarbamoyloxy)alkanoate derivatives [I] of the present invention exert a strong anti-microbial activity against various microorganisms including phytopathogenic fungi (e.g. *Pyricularia oryzae, Cochliobolus miyabeanus, Xanthomonas oryzae, Sphaerotheca fuliginea, Pellicularia sasakii, Pellicularia filamentosa, Fusarium oxysporum, Corticium rolfsii, Botrytis cinerea, Sclerotinia sclerotiorum, Alternaria kikuchiana, Alternaria mali, Glomerella cingulata, Pythium aphanidermatum*) and parasites of industrial products (e.g. Aspergillus niger).

For instance, ethyl N-(3,5-dichlorophenyl)thiocarbamoylthioacetate gives the following anti-fungal and bacterial spectrum when determined by the agar dilution method:

Table

| Test organism | Minimal inhibitory concentration (ppm) |
| --- | --- |
| Pyricularia oryzae | 8 |
| Xanthomonas oryzae | 40 |
| Pellicularia | 40 |
| Fusarium oxysporum f. niveum | 40 |
| Corticium rolfsii | 8 |
| Botrytis cinerea | 200 |
| Sclerotinia sclerotiorum | 40 |
| Alternaria kikuchiana | 40 |
| Alternaria mali | 40 |
| Glomerella cingulata | 8 |
| Aspergillus niger | 40 |

Some of the test results which also support the anti-fungal activity of the α-(N-phenylcarbamoyloxy)alkanoate derivatives [I] are shown below.

TEST 1

The test compound, in wettable powder form, was diluted with water to make a 1,000 ppm concentration. The compound was then applied to rice plants cultured in pots of 9 cm in diameter and grown up to the three leaved stage. 7 ml of the dilution was applied to each pot. After one day, the plants were sprayed to inoculate them with a spore suspension of *Pyricularia oryzae*. Five days thereafter, the number of diseased spots was counted. The results are shown in the following table. It is seen that the α-(N-phenylcarbamoyloxy)alkanoate derivatives [I] have stronger anti-fungal activity than the known compound, i.e. ethyl α-(N-phenylcarbamoylthio) acetate.

Table

| Test compound | Number of diseased spots per 10 leaves |
| --- | --- |
| Ethyl-N-(3,5-dichlorophenyl)-carbamoylthioacetate | 19 |
| Ethyl N-(3,5-dichlorophenyl)-thiocarbamoylthioacetate | 9 |
| Ethyl α-[N-(3,5-dichlorophenyl)-thiocarbamoyloxypropionate | 28 |
| N-(3,5-Dichlorophenyl)carbamoyl-thioacetic acid | 25 |
| Ethyl N-phenylcarbamoylthio-acetate | 176 |
| Control (Untreated) | 193 |

TEST 2

The test compound in dust form (4.0% by weight concentration) was applied to rice plants cultured in pots of 9 cm in diameter and grown up to the four leaved stage. 100 mg of the dust was applied per pot with the use of a duster. After one day, the plants were sprayed to inoculate them with a spore suspension of *Cochliobolus miyabeanus*. Three days thereafter, the number of diseased spots was counted. The results are shown in the following table. It is seen from said table that the α-(N-phenylcarbamoyloxy)alkanoate derivatives [I] have stronger anti-fungal activity than the known compounds, ethyl N-phenylcarbamoylthioacetate and O-ethyl S,S-diphenyldithiophosphate.

Table

| Test compound | Number of diseased spots per leaf |
| --- | --- |
| Ethyl α-[N-(3,5-dichlorophenyl)-carbamoyloxy]propionate | 7.8 |
| Ethyl N-(3,5-dichlorophenyl)-carbamoylthioacetate | 3.6 |
| Ethyl α-[N-(3,5-dichlorophenyl)-thiocarbamoyloxy]propionate | 6.5 |
| N-(3,5-Dichlorophenyl)carbamoyl-oxyacetic acid | 8.9 |
| N-(3,5-Dichlorophenyl)carbamoyl-thioacetic acid | 6.1 |
| Ethyl N-phenylcarbamoylthio-acetate | 58.0 |
| O-Ethyl S,S-diphenyldithiophos-phorodithiolate | 23.9 |
| Control (Untreated) | 61.7 |

TEST 3

The test compound in wettable powder form was diluted with water to make a 500 ppm concentration. The dilution was then applied to pumpkin seedlings cultured in pots of 12 cm in diameter and grown up to the three to four leaved stage. 7 ml of the dilution was applied per pot. After one day, the plants were sprayed to inoculate them with a spore suspension of *Sphaerotheca fuliginea*. Ten days thereafter, an infectious state was observed on the upper four leaves, and the degree of damage was calculated from the invectious area according to the following equation:

Degree of damage = Σ (Infection index × Number of leaves)/(Total number of leaves × 5) × 100 wherein the infection index was determined based on the following criteria:

| Infectious area | Index number |
| --- | --- |
| None | 0 |
| Small | 1 |
| Medium | 3 |
| Large | 5 |

The results are shown in the following table, from which it is seen that the α-(N-phenylcarbamoyloxy)alkanoate derivatives [I] have strong anti-fungal activity in a level nearly equal to that of a commercially available anti-fungal agent, dinocap (4,6-dinitro-2-(1-methylheptyl)phenyl crotonate).

Table

| Test compound | Degree of damage |
| --- | --- |
| Ethyl α-[N-(3,5-dichlorophenyl)- | |

Table-Continued

| Test compound | Degree of damage |
| --- | --- |
| carbamoyloxy]propionate | 3.8 |
| Ethyl N-(3,5-dichlorophenyl)-carbamoylthioacetate | 1.6 |
| Ethyl N-(3,5-dichlorophenyl)-thiocarbamoylthioacetate | 6.7 |
| Ethyl α-[N-(3,5-dichlorophenyl)-thiocarbamoyloxy]propionate | 8.6 |
| N-(3,5-Dichlorophenyl)carbamoyl-oxyacetic acid | 5.9 |
| N-(3,5-Dichlorophenyl)carbamoyl-thioacetic acid | 3.7 |
| Ethyl N-phenylcarbamoylthio-acetate | 45.6 |
| Dinocap | 3.9 |
| Control (Untreated) | 41.3 |

TEST 4

Into each pot (9 cm in diameter) there was charged field soil, and a soil (10 ml) infected with *Pellicularia filamentosa* was dispersed over the surface. The test compound in emulsifiable concentrate form was diluted with water to make a 500 ppm concentration, and the dilution was poured into said pot at a concentration of 15 ml per 3.3 m$^2$. After 2 hours, 10 seeds of cucumber were sowed therein. 5 days thereafter, the infectious state of the grown seedlings was observed, and the percentage of stand was calculated according to the following equation:

Percentage of stand = (Number of healthy seedlings in treated plot/Number of germination in untreated plot) × 100

The results are shown in the following table, from which it is seen that the α-(N-phenylcarbamoyloxy)alkanoate derivatives [I] have strong anti-fungal activity in a level nearly equal to that of a commercially available anti-fungal agent, pentachloronitrobenzene.

Table

| Test compound | Percentage of stand |
| --- | --- |
| Ethyl N-(3,5-dichlorophenyl)-carbamoylthioacetate | 93.8 |
| Ethyl N-(3,5-dichlorophenyl)-thiocarbamoylthioacetate | 100.0 |
| Ethyl α-[N-(3,5-dichlorophenyl)-thiocarbamoyloxy]propionate | 90.2 |
| N-(3,5-Dichlorophenyl)carbamoyl-thioacetic acid | 89.1 |
| Ethyl N-phenylcarbamoylthio-acetate | 0 |
| Pentachloronitrobenzene | 88.5 |
| Control (Untreated) | 0 |

The above descriptions clearly demonstrate that the α-(N-phenylcarbamoyloxy)alkanoate derivatives [I] are useful as anti-microbial agents; in particular, as agricultural fungicides and industrial fungicides. In other words, they may be used as agricultural chemicals for the prevention or inhibition of plant diseases caused by phyto-pathogenic fungi. They may also be used as industrial chemicals for the prevention or inhibition of staining on industrial products.

For said use, the α-(N-phenylcarbamoyloxy)-alkanoate derivatives [I] may be employed as is but, in most practical cases, they are extended with a suitable carrier(s) to make a conventional preparation form such as dust, wettable powder, oil spray, aerosol, tablet, emulsifiable concentrate, pellet or granule. Besides the α-(N-phenylcarbamoyloxy)alkanoate derivatives [I], the anti-microbial compositions may contain one or more known fungicides (e.g. Blasticidin S, Kasugamycin, Polyoxyin, Cellocidin, Chloramphenicol, O,O-diethyl-S-benzylphosphorothiolate, O-ethyl-S,S-diphenylphosphorodithiolate, O-n-butyl-S-ethyl-S-benzylphosphorodithiolate, O,O-diisopropyl-S-benzylphosphorothiolate, O-ethyl-S-benzylphenylthiophosphonate, pentachlorobenzaldoxime, pentachlorobenzyl alcohol, pentachloromandelonitrile, pentachlorophenyl acetate, iron methylarsonate, ferric ammonium methyl arsonate, γ-1,2,3,4,5,6-hexachlorocyclohexane, 1,1,1-trichloro-2,2-bis(p-chlorophenyl)ethane, O,O-dimethyl-O-(p-nitrophenyl)-phosphorothioate, S-[1,2-bis(ethoxy carbonyl)ethyl] O,O-dimethyl phosphorodithioate, O,O-dimethyl S-(N-methylcarbamoylmethyl) phosphorodithioate, O-ethyl O-p-nitrophenyl phenylphosphonothiorate, α-naphthyl N-methyl carbamate, O,O-dimethyl-O-(p-nitro-m-methylphenyl) phosphorothioate, 3,4,5,-6-tetrahydrophthalimidemethyl chrysanthemate, 3,4-dimethylphenyl N-methylcarbamate, O,O-diethyl O-(2-isopropyl-6-methyl-4-pyrimidinyl)thiophosphate, O,O-dimethyl-2,2-dichlorovinyl phosphate, 1,1-bis(p-chlorophenyl)-2,2,2-trichloroethanol, 1,2-dibromoethane, 1,2-dibromo-3-chloropropane, zinc ethylene bis(dithiocarbamate), manganese ethylene bis(dithiocarbamate), 2,3-dichloro-1,4-naphthoquinone, N-(trichloromethylthio)-4-cyclohexene-1,2-dicarboximide, N-(1,1,2,2-tetrachloroethylthio)-4-cyclohexene-1,2-dicarboximide, 6-methyl-2,3-quinoxaline dithiol cyclic carbonate, tetrachloroisophthalonitrile, sodium p-dimethylaminobenzenediazosulfonate, 2,4-dichloro-6-(2-chloroanilino)s-triazine, 2,4-dichlorophenoxyacetic acid, 4-chloro-2-methylphenoxyacetic acid, 3,4-dichloropropionanilide, 2,4-dichlorophenyl-4'-nitrophenyl ether, 2-chloro-4,6-bis(ethylamino)-s-triazine, sodium N-(1-naphthyl)phthalamate, etc.). The microbial compositions may also contain one or more materials known to be active as insecticides, nematocides, acaricides, herbicides, fertilizers, soil conditioners, soil disinfectants or plant growth regulators. Examples of typical microbial compositions according to this invention are:

a. Dusts obtained by dispersing at least one of the α-(N-phenylcarbamoyloxy)alkanoate derivatives [I] as the active ingredient in a concentration of 0.1 to 50 % by weight in an inert carrier (e.g. talc, diatomaceous earth, wood flour, clay).

b. Wettable powders obtained by dispersing at least one of the α-(N-phenylcarbamoyloxy)alkanoate derivatives [I] as the active ingredient in a concentration of 0.1 to 80 % by weight in an inert absorbent carrier (e.g. diatomaceous earth) together with a wetting and/or dispersing agent such as an alkali metal salt of a long aliphatic sulfate chain, a partly neutralized sulfuric acid derivative of either a petroleum oil or a natural occurring glyceride, or a condensation product of an alkylene oxide with an organic acid.

c. Emulsifiable concentrates obtained by dispersing at least one of the α-(N-phenylcarbamoyloxy)alkanoate derivatives [I] as the active ingredient in a concentration of 0.1 to 50% by weight in an organic solvent (e.g. dimethylsulfoxide) plus an emulsifier such as an alkali metal salt of a long aliphatic sulfate chain, a partly neutralized sulfuric acid derivative of either a petroleum oil or a natural occurring glyceride, or a condensation product of an alkylene oxide with an organic acid.

d. Compositions of the α-(N-phenylcarbamoyloxy) alkanoate derivatives [I] formulated in the manner commonly employed in the art for the preparation of microbicidal granules, dusts and aerosols.

Practical and presently preferred embodiments of the present invention are illustratively shown in the following Examples. In these Examples, parts and percent are by weight.

EXAMPLE 1

Preparation of the α-(N-phenylcarbamoyloxy)alkanoate derivatives [I]: A 200 milliliter volume flask is charged with 3,5-dihalogenated phenyl isocyanate derivative [II] (0.1 mol) and a catalytic amount of pyridine and isopropyl ether (50 ml). A solution of glycolic acid derivative [III] (0.1 mol) in isopropyl ether (50 ml) is added dropwise thereto while stirring. The resultant mixture is heated with reflux for 1 hour. After cooling, the precipitated cyrstals are collected by filtration and dried to yield α-(N-phenylcarbamoyloxy)alkanoate derivative [I] at a very high yield.

Examples of the α-(N-phenylcarbamoyloxy)alkanoate derivative [I] prepared by the above procedure are shown in the following table:

and mixed well to make a dust containing 3 % of the active ingredient. The dust is applicable as such.

EXAMPLE 3

Preparation of dust:
Ethyl α-[N-(3,5-dichlorophenyl)]carbamoylthioacetate (4 parts) and talc (96 parts) are crushed and mixed well to make a dust containing 4 % of the active ingredient. The dust is applicable as such.

EXAMPLE 4

Preparation of wettable powder:
Ethyl N-(3,5-dichlorophenyl)thiocarbamoylthioacetate (50 parts), a wetting agent (alkylbenzenesulfonate) (5 parts) and diatomaceous earth (45 parts) are crushed and mixed well to make a wettable powder containing 50 % of the active ingredient. The wettable powder is diluted with water and then applied.

EXAMPLE 5

Preparation of emulsifiable concentrate:
Ethyl α-[N-(3,5-dichlorophenyl)thiocarbamoyloxy]-propionate (10 parts), dimethylsulfoxide (80 parts) and an emulsifier (polyoxyethylenephenylphenol ether) (10 parts) are mixed well to make an emulsifiable concentrate containing 10 % of the active ingredient. The emulsifiable concentrate is diluted with water and then applied.

Table

| Starting materials | | | Product | | | Elementary analysis Calcd. (Found) (%) | | | | |
|---|---|---|---|---|---|---|---|---|---|---|
| 3,5-Dihalogenated phenyl isocyanate derivative [II] | Glycolic acid derivative [III] | α-(N-Phenyl-carbamoyloxy)-alkanoate derivative [I] | Melting point (°C) | Yield (%) | | C | H | N | Cl | S |
| 3,5-Dichloro-phenyl isocyanate | Ethyl lactate | Ethyl α-[N-(3,5-dichlorophenyl)-carbamoyloxy]-propionate | 75.0-76.0 | 95 | | 47.08 (47.24) | 4.28 (4.01) | 4.58 (4.48) | 23.16 (22.97) | - - |
| 3,5-Dichloro-phenyl isocyanate | Ethyl thioglycolate | Ethyl N-(3,5-dichlorophenyl)-carbamoylthio-acetate | 136.0 - 137.0 | 93 | | 42.87 (42.46) | 3.60 (3.30) | 4.55 (4.53) | 23.01 (22.80) | 10.45 (10.18) |
| 3,5-Dichloro-phenyl isothio-cyanate | Ethyl thioglycolate | Ethyl N-(3,5-dichlorophenyl)-thiocarbamoyl-thioacetate | 115.5 - 117.0 | 90 | | 40.75 (40.63) | 3.42 (3.26) | 4.32 (4.49) | 21.85 (21.77) | 19.78 (19.41) |
| 3,5-Dichloro-phenyl isothio-cyanate | Ethyl lactate | Ethyl α-[N-(3,5-dichlorophenyl)-thiocarbamoyl-oxy]propionate | 50.0-54.0 | 84 | | 44.73 (45.12) | 4.07 (4.22) | 4.35 (4.15) | 22.01 (21.63) | 9.95 (9.20) |
| 3,5-Dichloro-phenyl isocyanate | Glycolic acid | N-(3,5-Dichloro-phenyl)carbamoyl-oxyacetic acid | 156.5 - 158.5 | 91 | | 40.93 (40.84) | 2.67 (2.77) | 5.30 (5.31) | 26.85 (26.53) | - - |
| 3,5-Dichloro-phenyl isocyanate | Thioglycolic acid | N-(3,5-Dichloro-phenyl)carbamoyl-thioacetic acid | 122.0 - 124.5 | 90 | | 38.59 (38.92) | 2.52 (2.69) | 5.00 (4.98) | 25.31 (25.56) | 11.45 (11.33) |

EXAMPLE 2

Preparation of dust:
Ethyl α-[N-(3,5-dichlorophenyl)carbamoyloxy]-propionate (3 parts) and clay (97 parts) are crushed

EXAMPLE 6

Preparation of granule:
N-(3,5-Dichlorophenyl)carbamoyloxyacetic acid (5 parts), clay (93.5 parts) and a binding agent (polyvinyl alcohol) (1.5 parts) are crushed and mixed well. The mixture is kneaded with water and granulated to make granules containing 5 % of the active ingredient. The granules are applicable as such.

EXAMPLE 7

Preparation of dust:

N-(3,5-Dichlorophenyl)carbamoylthioacetic acid (2 parts), O-n-butyl-S-ethyl-S-benzylphosphorodithiolate (1.5 parts), Kasugamycin (0.1 part) and clay (96.4 parts) are crushed and mixed well to make a dust containing 3.6 % of the active ingredients. The dust is applicable as such.

EXAMPLE 8

Preparation of dust:

Ethyl α-[N-(3,5-dichlorophenyl)carbamoyloxy]-propionate (2 parts), O-n-butyl-S-ethyl-S-benzylphosphorodithiolate (1.5 parts), O,O-dimethyl-O-(3-methyl-4-nitrophenyl)phosphorothioate (2 parts), 3,4-dimethylphenyl-N-methylcarbamate (1.5 parts) and clay (93 parts) are crushed and mixed well to make a dust containing 7 % of the active ingredients. The dust is applicable as such.

What is claimed is:

1. An anti-fungal composition for agricultural and industrial use comprising an α-(N-phenylcarbamoyloxy) alkanoate derivative of the formula:

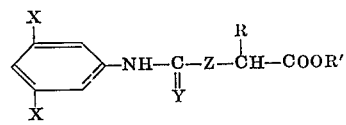

wherein X is halogen, Y and Z are each oxygen or sulfur, R is hydrogen or lower alkyl and R' is hydrogen or lower alkyl, said active derivative being present in at least an amount effective to suppress fungal growth, and an inert carrier.

2. A method for suppressing the growth of fungi comprising the step of contacting said fungi with an α-(N-phenylcarbamoyloxy) alkanoate derivative of the formula:

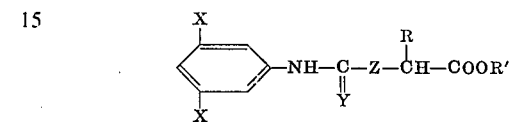

wherein X is halogen, Y and Z are each oxygen or sulfur, R is hydrogen or lower alkyl and R' is hydrogen or lower alkyl, said derivative being present in at least an amount effective to suppress fungal growth.

3. The composition as claimed in claim 1 wherein X is chlorine, bromine or iodine and R and R' are each individually selected from the group consisting of hydrogen and alkyl having 1 to 5 carbon atoms.

4. The method as claimed in claim 2 wherein X is chlorine, bromine or iodine and R and R' are each individually selected from the group consisting of hydrogen and alkyl having 1 to 5 carbon atoms.

* * * * *